(12) United States Patent
Kwan

(10) Patent No.: US 6,375,031 B1
(45) Date of Patent: *Apr. 23, 2002

(54) CONTAINER FOR LIQUIDS HAVING VIEWING WINDOW

(75) Inventor: Steven Kwan, Kowloon (HK)

(73) Assignee: Merry Chance Industries, Ltd. (HK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/360,433

(22) Filed: Jul. 26, 1999

(51) Int. Cl.⁷ ............................................... B65D 25/56
(52) U.S. Cl. ........................... 220/663; 73/323; 73/334; 215/365
(58) Field of Search .......................... 220/663; 156/73.1, 156/252; 114/173, 177; 215/365, 366; 116/276; 73/323, 330, 331, 334

(56) References Cited

U.S. PATENT DOCUMENTS

| | | | | |
|---|---|---|---|---|
| 291,296 A | * | 1/1884 | Colby ........................... | 73/334 |
| 739,423 A | * | 9/1903 | Jones ........................... | 73/334 |
| 801,793 A | * | 10/1905 | Kibele ........................... | 220/663 |
| 3,483,611 A | * | 12/1969 | Balamuth et al. .............. | 29/509 |
| 3,633,421 A | * | 1/1972 | Phillips .................... | 73/861.55 |
| 3,895,522 A | | 7/1975 | Skvarenina | |
| 3,963,814 A | * | 6/1976 | Cospen et al. .............. | 156/73.1 |
| 4,072,243 A | | 2/1978 | Conant et al. | |
| 4,228,062 A | | 10/1980 | Lee, Jr. et al. | |
| 4,338,708 A | * | 7/1982 | Hanson et al. ................. | 445/22 |
| 4,603,443 A | * | 8/1986 | Stewart ......................... | 73/330 |
| 4,638,928 A | | 1/1987 | Webster | |
| 4,669,410 A | * | 6/1987 | Howell ........................ | 114/173 |
| 4,769,406 A | | 9/1988 | Keithley | |
| 4,928,514 A | | 5/1990 | Beaston | |
| 5,110,381 A | | 5/1992 | Heckard et al. | |
| 5,116,905 A | | 5/1992 | Belfoure et al. | |
| 5,321,911 A | * | 6/1994 | Dickinson .................... | 49/404 |
| 5,397,408 A | | 3/1995 | Guzik et al. | |
| 5,551,482 A | | 9/1996 | Dixon et al. | |
| 5,624,759 A | | 4/1997 | Usifer et al. | |
| 5,842,433 A | * | 12/1998 | Kyle .......................... | 114/173 |
| 5,843,265 A | | 12/1998 | Grimm | |

* cited by examiner

Primary Examiner—Stephen P. Garbe
Assistant Examiner—Joseph C. Merek
(74) Attorney, Agent, or Firm—Greer, Burns & Crain, Ltd.

(57) ABSTRACT

A container for liquids having a receptacle suitable for containing a liquid, the receptacle having a wall portion and a floor portion joined to contain liquid, the wall portion having an aperture suitable for allowing a substantial portion of the liquid to be viewed therethrough; and a window means for allowing a user to view the liquid contained in the receptacle, the window means being located contiguous with the aperture so as to prevent liquid from escaping from the receptacle through the aperture. The window means has an outer window crystal configured to overlap the aperture when located thereover; an inner window crystal having substantially the same dimension as the outer window crystal and at least one of the inner window crystal or outer window crystal having a raised portion located substantially around its perimeter, the raised portion juxtaposed with the aperture so as to mate with the aperture and protrude through the aperture when the window crystal is located over the aperture; and a sealing ring configured to fit within a space between the inner window crystal and the wall portion when the inner window crystal is located over the aperture.

12 Claims, 6 Drawing Sheets

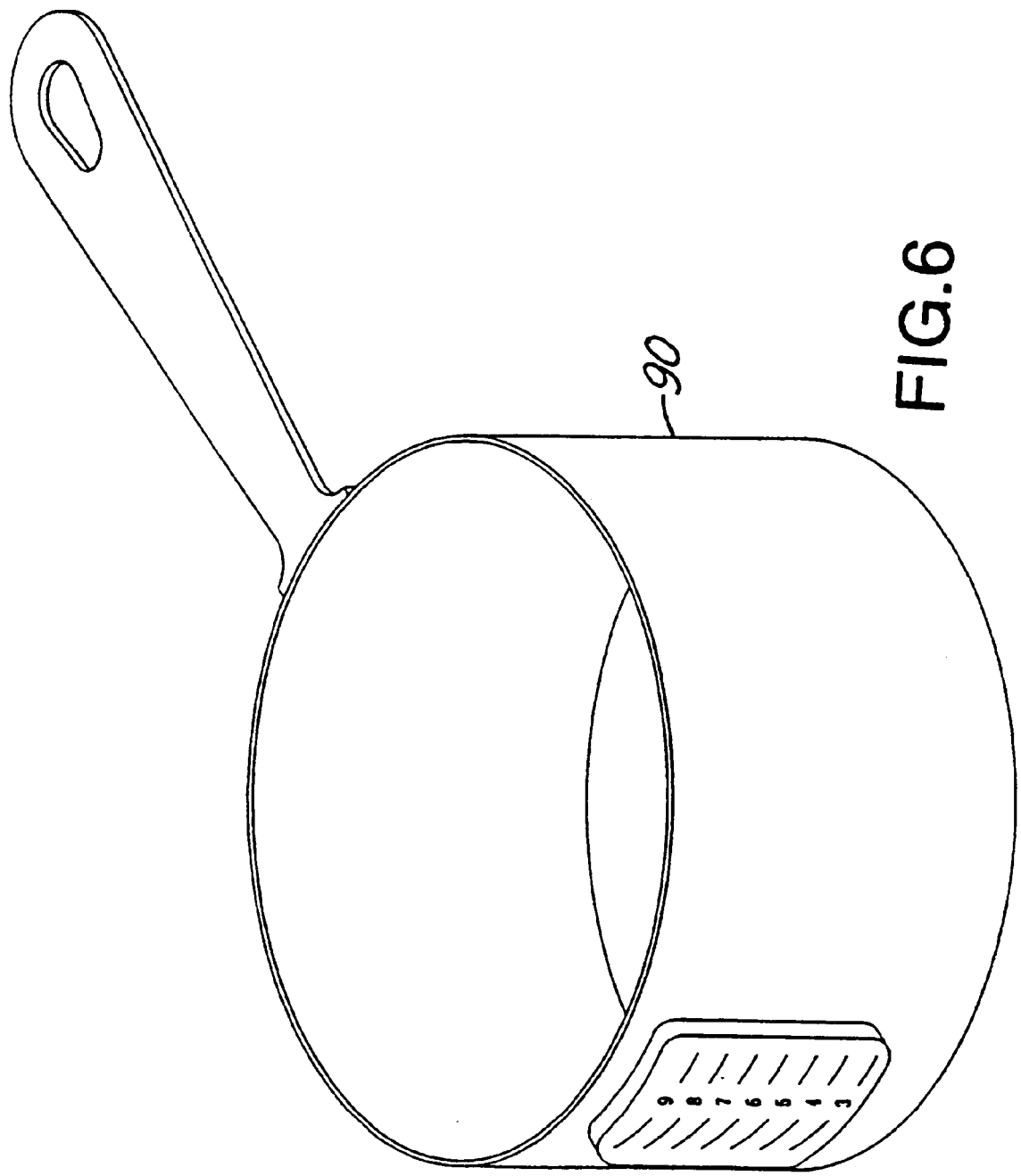

CONTAINER FOR LIQUIDS HAVING VIEWING WINDOW

BACKGROUND OF THE INVENTION

The present invention relates to containers such as those utilized for liquids and the like.

It is often desirable to fabricate containers for liquids, such as measuring cups and milk or syrup containers, from a durable material such as stainless steel. The use of such a durable material prevents accidental breakage due to dropping on a floor, which may occur for example in the food service industries such as restaurants. However, the use of a material such as stainless steel prevents a user from readily observing the amount of liquid remaining in the container. Thus, when a stainless steel cup is used for milk and placed on a table in a restaurant, a waiter cannot tell if the milk needs replenishment without disturbing the patrons to open the lid of the cup.

A similar problem exists when a stainless steel cup is used as a measuring cup. Since the liquid level cannot easily be compared to the measuring marks on the outside of the cup, it is difficult to obtain a quick and accurate reading of the volume of liquid in the cup.

It is therefore an object of the present invention to provide a durable container for liquids that allows a user to view with ease the level of liquid contained therein.

It is a further object of the invention to provide such a container with a transparent viewing window that does not leak the liquid.

SUMMARY OF THE INVENTION

In accordance with these and other objects, provided is a container for liquids comprising a receptacle suitable for containing a liquid, the receptacle comprising a wall portion and a floor portion joined to contain liquid therein, the wall portion comprising an aperture suitable for allowing a substantial portion of the liquid to be viewed therethrough; and a window means for allowing a user to view the liquid contained in the receptacle, the window means being located contiguous with the aperture so as to prevent liquid from escaping from the receptacle through the aperture.

The window means comprises an outer window crystal configured to overlap the aperture when located thereover; an inner window crystal having substantially the same dimension as the outer window crystal and comprising a raised portion located substantially around its perimeter, the raised portion juxtaposed with the aperture so as to mate with the aperture and protrude through the aperture when the inner window crystal is located over the aperture; and a sealing ring configured to fit within a space between the inner window crystal and the wall portion when the inner window crystal is located over the aperture. The inner window crystal and the outer window crystal are made of a plastic material, and the raised portion of the inner window crystal makes substantial contact with the outer window crystal when both are placed in opposing relation around the aperture. Furthermore, the raised portion of the inner window crystal and the outer window crystal are joined together so as to form, in conjunction with the sealing ring, a watertight seal around the aperture of the receptacle.

Preferably, the receptacle is made from metal such as stainless steel, and the inner window crystal and the outer window crystal are made from a plastic comprising a polycarbonate, and the sealing ring is made from silicone rubber. The raised portion of the inner window crystal and the outer window crystal are joined together by an ultrasonic bonding process.

The container finds particular use as a measuring cup having a plurality of graduated measuring indices located thereon. In addition, the outer window crystal may have a plurality of graduated measuring indices located thereon.

In one embodiment, the raised portion of the inner window crystal comprises a plurality of curvilinear portions, and the shape of the aperture comprises a plurality of curvilinear portions adapted to substantially align with the plurality of curvilinear portions of the raised portion of the inner window crystal.

The present invention is also a method of assembling a container for liquids comprising the steps of forming, in a wall portion of a receptacle suitable for containing a liquid, an aperture suitable for allowing a substantial portion of a liquid to be viewed therethrough, the receptacle further comprising a floor portion joined to the wall portion for containing liquid therein; and assembling over the aperture a window means for allowing a user to view the liquid contained in the receptacle, the window means being located contiguous with the aperture so as to prevent liquid from escaping from the receptacle through the aperture. The term liquid will be understood to include those particulate substances capable of conforming to the shape of a container, which might also include powders and granular substances.

The assembling step further comprises the steps of locating over the aperture an outer window crystal configured to overlap the aperture; locating a sealing ring over the aperture on the inside of the receptacle; and locating an inner window crystal over the sealing ring so as to mate with the aperture and protrude through the aperture. The inner window crystal has substantially the same dimension as the outer window crystal and comprises a raised portion located substantially around its perimeter. The inner window crystal and the outer window crystal are made of a plastic material, and the raised portion of the inner window crystal makes substantial contact with the outer window crystal when both are placed in opposing relation around the aperture.

The final step of the assembling process is the step of joining the raised portion of the inner window crystal to the outer window crystal so as to form, in conjunction with the sealing ring, a watertight seal around the aperture of the receptacle. In particular, the raised portion of the inner window crystal and the outer window crystal are joined together by an ultrasonic bonding process. The raised portion may optionally be located on the outer window crystal.

BRIEF DESCRIPTION OF THE DRAWING

FIG. 6 is a perspective view of a liquid container in the form of a saucepan in accordance with the invention.

DETAILED DESCRIPTION OF THE PREFERRED EMBODIMENT

Figure 1:
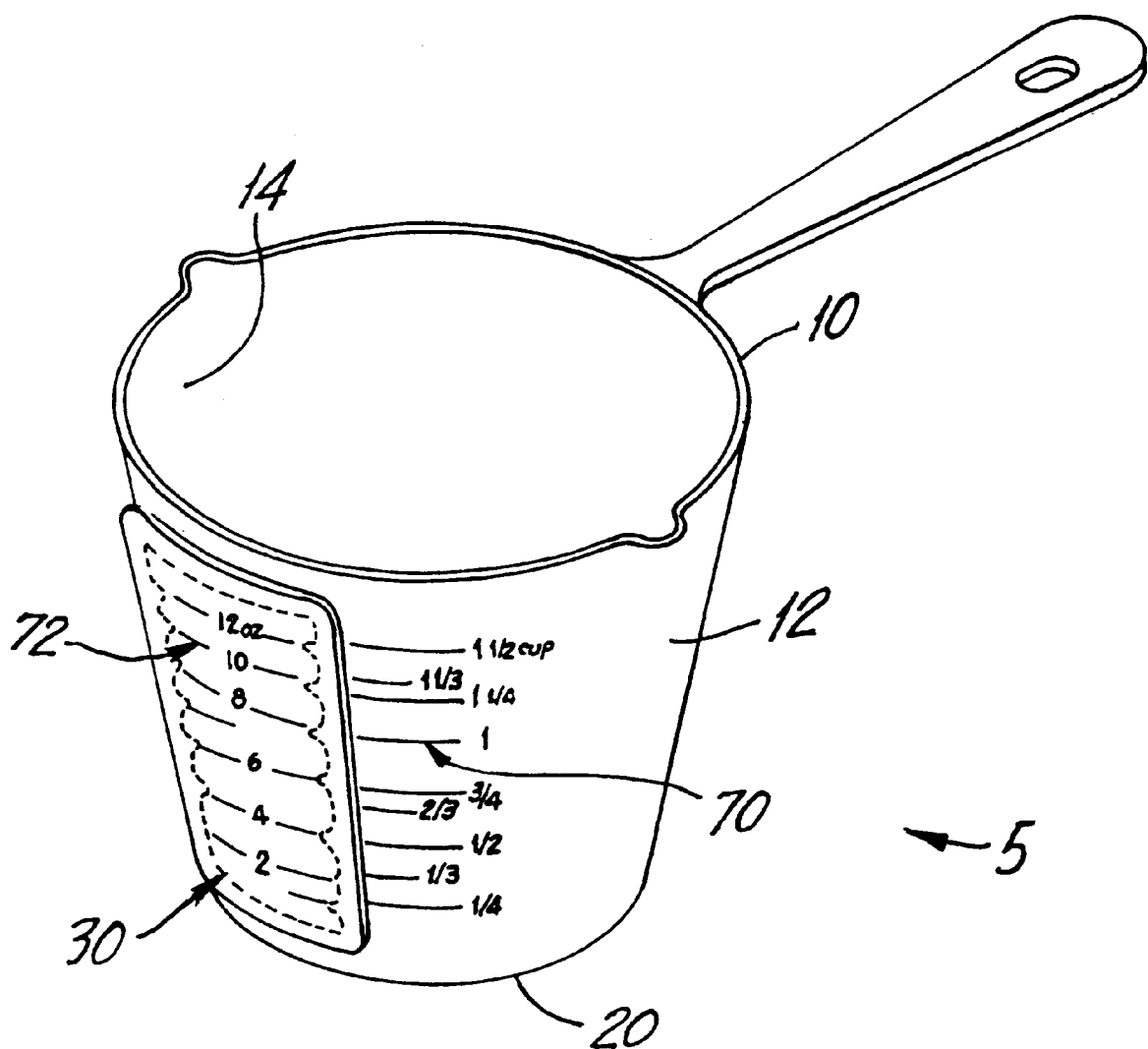
FIG. 1 is a perspective view of a liquid container in the form of a measuring cup in accordance with the invention.

With reference to the drawings, the perspective view in FIG. 1 shows a container 5 for liquids in the form of a measuring cup with a handle that comprises a receptacle 10 that is made of a wall portion 11 comprising an outer wall surface 12 and an inner wall surface 14 joined to a floor portion 20 with an aperture means 40 located through a portion of the receptacle wall. The aperture means 40 provides for visibility into the receptacle 10 by allowing a user to look through the aperture means 40 to view the level of the contents contained therein. Window means 30 is located over the aperture means such that liquids may be contained therein where the window means is preferably transparent. In the preferred embodiment, the wall portion 11 and floor portion 20 are made of metal.

In the preferred embodiment, the container 5 may be used to contain a product that may comprise either liquid or granular material such as sugar, that when placed into the container generally conforms to the interior wall 14 and floor 20 configuration to attain a level. The window means 30 or the receptacle 10 may optionally comprise measuring means where the internal and external surfaces may be inscribed or embossed with graduations 70, 72 that may be used to indicate the level of product contained therein.

Figure 2:
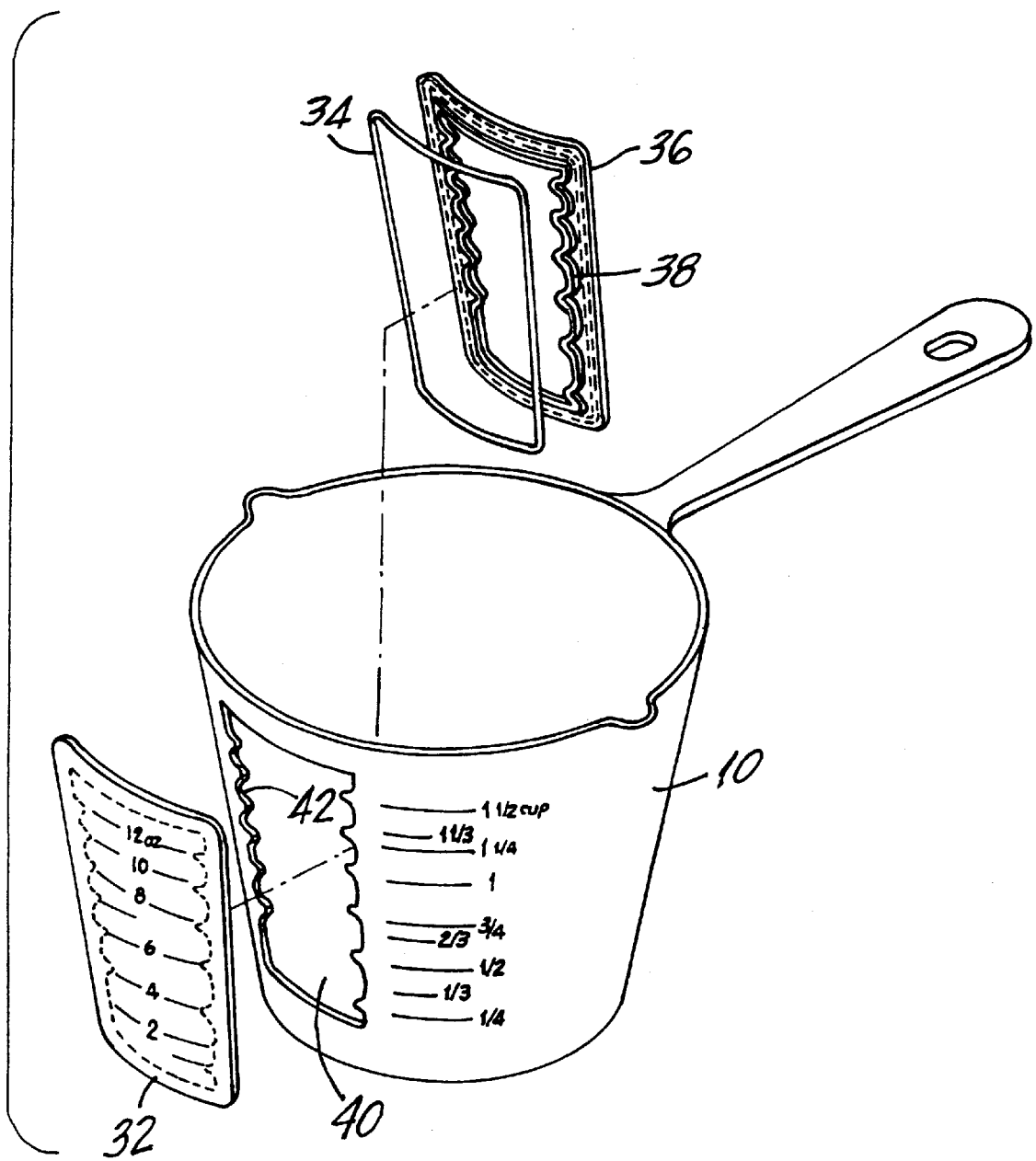
FIG. 2 is an exploded view of the container of FIG. 1.

With reference to FIG. 2, the aperture means 40 comprises an area through the receptacle 10 where the window means 30 may be located to allow to view the enclosed liquid. In the preferred embodiment, the aperture means is of a generally rectangular shape, where the longer portion of the rectangle is aligned with the vertical axis of the container such that a level of liquid placed into the container may be indicated from near empty to near full. The aperture edge 42 may be contoured in a curvilinear manner as shown in FIG. 2 to increase the surface contact region between the aperture edge 42 and the window means 30. Alternatively, the aperture edge 42 may be made of substantially straight sections joined by corner radii. The window means would likewise be configured to substantially match the straight edges of the aperture means. Other shapes for the aperture means 40 may also be considered that provide aesthetically pleasing configurations, and additionally, more than one aperture means may be defined in the receptacle.

Figure 3:
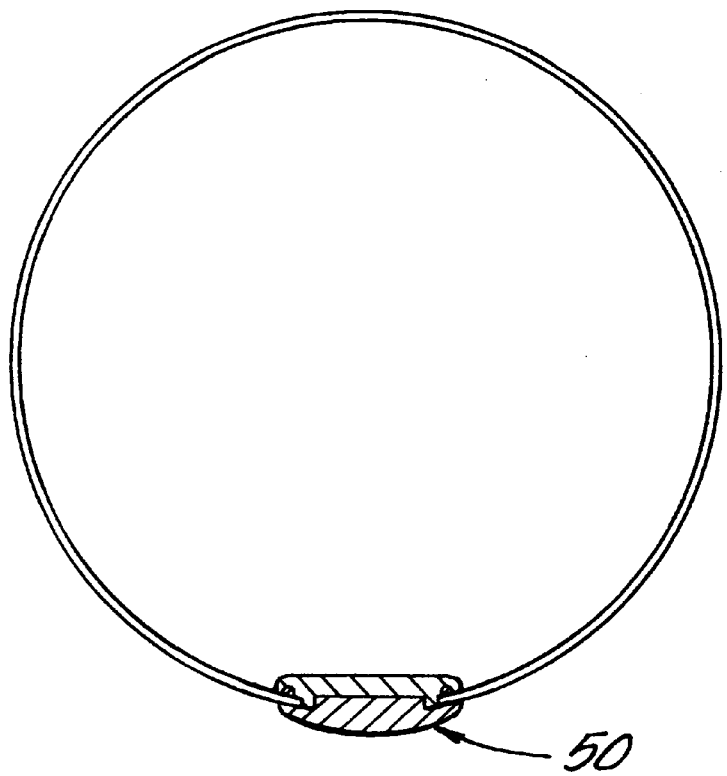
FIG. 3 is a cross-section view of a container of the present invention.
Figure 3A:
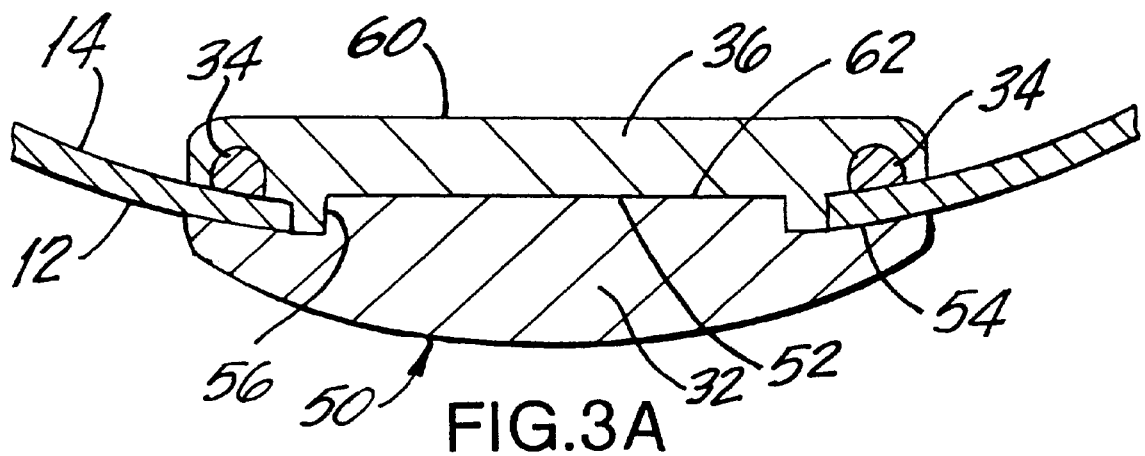
FIG. 3A is a detailed cross-section view of the window means of the present invention.
Figure 4:
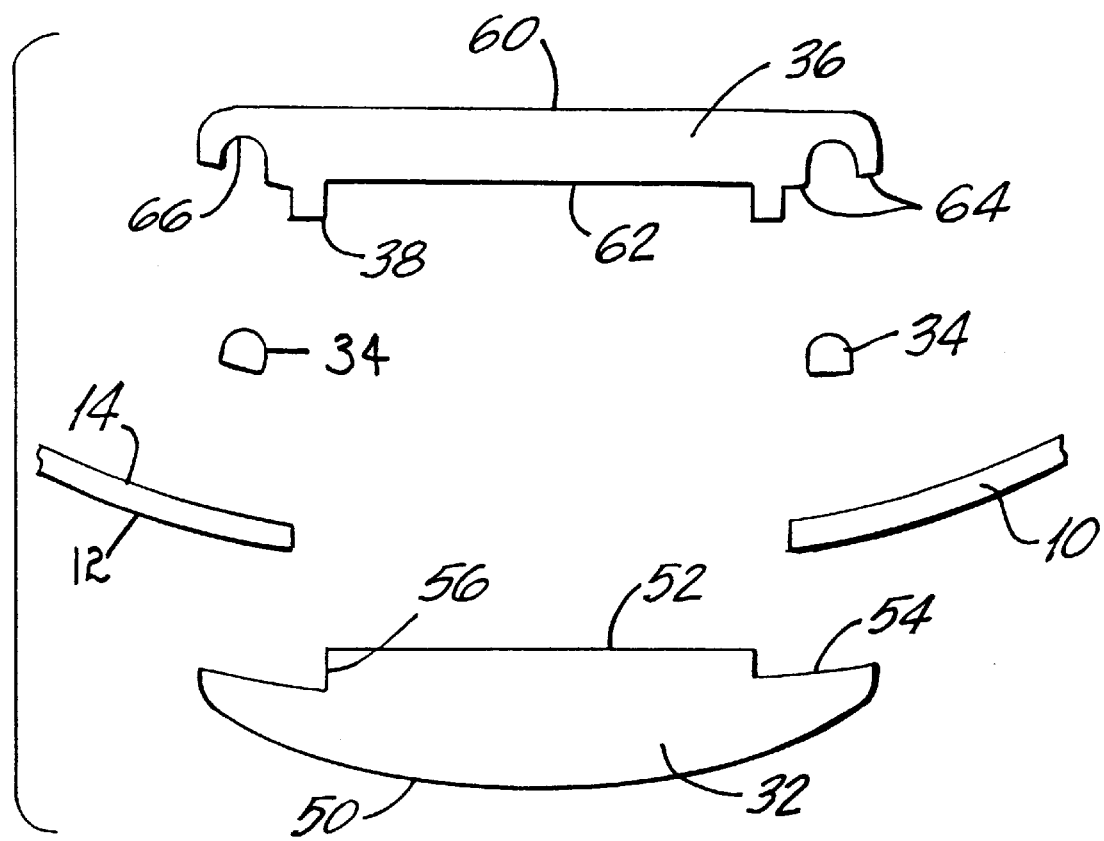
FIG. 4 is an exploded cross-section view of the window means of the present invention.

The window means 30 is made of component portions and is mounted through the wall aperture 40 of the wall of the receptacle 10 and comprises an outer window crystal 32, an inner window crystal 36, and a sealing ring 34 (see FIG. 3). The outer window crystal 32 is preferably made of transparent or translucent material such as plastic or polycarbonate where the first surface 50 of the outer window crystal 32 generally follows the outer wall 12 contour of the container. In another embodiment, the first surface 50 may be convex to form a significantly raised surface with respect to the outer wall 12 such the fluid level may be viewed indirectly by a user. The second surface of the outer window crystal 32 comprises a base portion 52 and a ledge portion 54 separated by a transition edge 56 (see FIGS. 3A, 4). The ledge portion 54 closely follows the contour of the container outer wall 12 and the transition edge is substantially parallel and offset from the aperture edge 42. In the preferred embodiment, the base portion 52 is substantially flat and is configured to be matched in shape with the matching face 62 of the inner window crystal 36 where they have substantially the same peripheral dimensions.

In one embodiment, the inner window crystal 36 (see FIGS. 3A, 4) comprises a matching face 62, a raised ridge 38, a ledge surface 64 that mates against the inner wall of the cup and a ledge recess 66 that is suitable for containing a sealing ring 34. The raised ridge 38 generally conforms to the shape of the aperture edge 42 and has an initial height that is suitable for bonding to the outer window crystal 32 to contain the thickness of the wall portion 11 of the receptacle 10. The ledge surface 64 is configured to have the contour of the inner wall 14 of the receptacle and preferably mates against the inner wall of the receptacle. The ledge recess 66 is configured to be of a suitable size and shape to house the sealing ring such that when it is located in the receptacle 10 the sealing ring 34 is pressed against the inner wall 14 of the receptacle, thus making a fluid tight seal. The sealing ring 34 may follow the edges of the aperture means or may alternatively follow the peripheral shape of the window means.

The relative heights of the matching surface 62, and ledge surface 64 (of the inner window crystal), must be closely controlled to allow for proper compression of the sealing ring when bonded with the outer window crystal. The general configuration of the individual components of the window means may vary depending on the types and shapes of products that are fabricated. These dimensions additionally depend upon the type of process used to seal the window means to the receptacle.

In the preferred embodiment, an ultrasonic weld process is used to join the window means 30 together such that bonding to the receptacle is achieved as the components of the window means bond to each other. It is understood that other methods of bonding such as adhesives may be employed in the fabrication of the container as long as an effective seal is generated.

Other embodiments may also be configured where the base portion 52 and the matching face 62 are other than substantially flat. It is possible that the window means may be established where the ledges 54, 64 and sealing ring 34 are configured as previously defined, but where the base portion 52 of the outer window crystal 32 and the matching face 62 of the inner window 36 are convex or concave with respect to the receptacle. This would allow for either viewing more of the internal contents of the container or allowing a user without direct line of sight, to view the level of the contents.

An embodiment will now be described that uses the ultrasonic welding process to fabricate the container. The ultrasonic weld process is more fully described in "Modern Plastics Encyclopedia Handbook". A brief overview of this process will be described here to demonstrate how the container of the present invention may be created. An ultrasonic weld machine converts an electrical signal into mechanical vibratory energy, which is amplified and passed through a horn to the connected component parts. The high frequency vibration causes friction between the touching components to locally cause the parts to melt together where they contact each other. Specific parameters of the process may be defined to assure adequate melting, bonding and solidification of the component parts. Automated equipment has allowed for sophisticated control of this process by modifying particular parameters that affect the final product. These parameters include: configuration of the contact areas; initial contact pressure prior to melting; subsequent contact pressure to further cause the components to melt; frequency modifications over time; and the overall compressive distance traveled of the original components from the initial contact position.

The method of assembling the container for liquids comprises forming a receptacle with an aperture means where a substantial portion of the contents to be stored therein may be viewed. The container such as a measuring cup, milk pourer 80 (see FIG. 5), saucepan 90 (see FIG. 6), or flour container 5 is then assembled with a window means 30 located through the aperture means 40 where a leak proof bond may be formed between window 30 and the receptacle 10. The outer window crystal 32 is placed over the aperture 40 and the sealing ring 34 and inner window crystal 36 is located on the inside of the receptacle 10 in alignment with the aperture 40 and the outer window crystal 32. The raised ridge 38 and the matching face 62 may locally interfere with the outer window crystal 32, the aperture edge 42, and the inner wall 14. The inner window crystal 30 and outer window crystal 36 and sealing ring 34 are then joined to the receptacle to make a watertight seal around the aperture 40. The joining process requires that the receptacle 10 is held in place. The inner window crystal 32 is attached to one part of the ultrasonic machine, while the outer window crystal 32 is attached to a second part of the machine and the sealing ring is located in the ledge recess 66 of the inner window crystal 14. The raised ridge 38 of the inner window crystal 14 may initially contact the aperture edge 42 of the receptacle 10 or may contact the aperture edge soon after the initial melting begins. Likewise the base portion 52 of the outer window crystal 32 may initially contact the matching face 62 of the inner window crystal 36 depending on the sealing properties desired. As the components are pressed together while the vibratory energy is applied, the parts begin to melt first at the initial contact points, then followed at more widespread contact areas.

Using a Bensonic model 902 ultrasonic welding machine the following settings have produced results demonstrating the watertight properties desired.

Output Power: 4 (max:6)

Pressure: 5.2 kg

Downstroke Speed: 8 sec

Delay Time: 3.8 sec

Welding Time: 1.08 sec

Holding Time: 2.88 sec

Loading: 800 w

Those skilled in the art may use other combinations to achieve a similar result.

When the end parameters of the ultrasonic welding process have been reached, the components of the window means are bonded to each other causing a seal to be formed on the inside surface. A bond may additionally be achieved between the ledge 54 of the outer window crystal 32 and the outer wall 12 of the receptacle, and between the ledge 64 of the inner window crystal 36 and the inner wall 14 of the receptacle. In addition to the seal provide by the sealing ring 34, a plastic to plastic and plastic to metal bond occurs between the components such that the container is less susceptible to having contaminants form between the plastic and metal surfaces of the container, which over time may lead to an unclean appearance.

In the preferred embodiment, the inner and outer window crystals partially penetrate the aperture means to contact each other where the seal is formed. In another embodiment, either one or the other of the window crystals may penetrate the wall to meet the oppositely located window crystal.

In the preferred embodiment, the plastic or polycarbonate used in the container has a melting point such that the container may be safely placed in a dishwasher or other sterilization equipment without affecting the bond between components. As polycarbonate and other transparent products emerge having better bonding ability between the window material and the receptacle, the use of the sealing ring 34 will not be required to achieve a satisfactory leak proof window seal.

Figure 5:
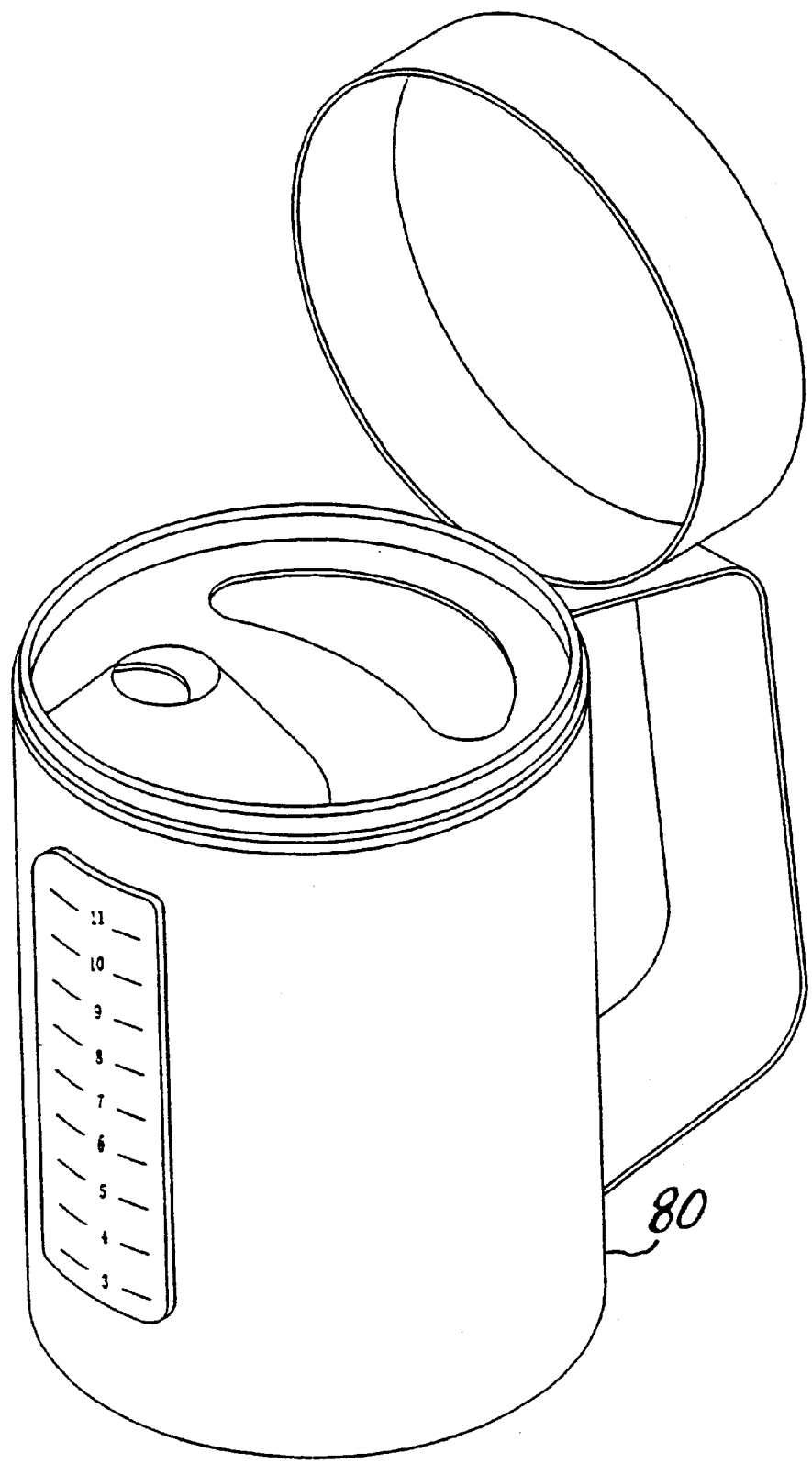
FIG. 5 is a perspective view of a liquid container in the form of a milk pouring cup in accordance with the invention.

Different embodiments may be fabricated using a window means mounted through a receptacle 10. FIG. 5 shows a container 80 shaped in the form of a milk pouring cup. The cup is fabricated of stainless steel and has the window means mounted so that the level of the contents may be readily determined without opening the attached lid. The container 90 shown in FIG. 6 is in the form of a saucepan.

It is also possible to use an insulating material layer in the receptacle where the window means is configured with sufficient material such that the window formed joins the inner window crystal 14 with the sealing ring 34 and outer window crystal 12 to provide a leak proof seal.

In the preferred embodiment, the material for the window means is transparent and clear, but other materials may be used that have similar properties. The window means may additionally be tinted in different color shades to provide different levels of light transmittal to the internally stored product.

The measuring means 70, 72 may be optionally included on the container where the measuring means may be located on the inside or outside of the container 5, either on the window means or the receptacle means. The measuring means may be applied to the components prior to assembly or after assembly depending on the degree of accuracy require for the location of the graduations. The measuring means may be an integral modification to part of the original components or may be an externally applied application layer.

The sealing ring may preferably be made of silicone rubber but other materials demonstrating a similar sealing ability may also be used. In another embodiment, a second sealing ring may be located between the ledge 54 of the outer window crystal 32 and the outer wall 12 of the receptacle 10.

The containers may be in a plurality of shapes with handles and lids. Other materials may also be used for the receptacle in addition to metal, such as ceramic, wood, or other non-transparent materials.

In addition to ultrasonic welding, induction bonding, electromagnetic bonding, infrared bonding or other processes may be used to create the containers of the present invention.

What is claimed is:

1. A container for liquids comprising:

a receptacle suitable for containing a liquid, the receptacle comprising a wall portion and a floor portion joined to contain liquid therein, the wall portion comprising an aperture suitable for allowing a substantial portion of the liquid to be viewed therethrough, an outer window crystal configured to overlap the aperture when located thereover;

an inner window crystal having substantially the same dimension as the outer window crystal, wherein at least one of the outer window crystal and the inner window crystal comprises a raised portion located substantially around the perimeter of the aperture, the raised portion juxtaposed with the aperture so as to mate with the aperture and protrude through the aperture when located over the aperture; and a sealing ring configured to fit within a space between the inner window crystal and the wall portion when the inner window crystal is located over the aperture;

wherein the inner window crystal and the outer window crystal are made of a plastic material, and the raised portion makes substantial contact with the opposing surface of the other window crystal when both are placed in opposing relation around the aperture;

wherein the inner window crystal and the outer window crystal are joined together so as to form, in conjunction with the sealing ring, a watertight seal around the aperture of the receptacle.

2. The container of claim 1 wherein the receptacle is made from metal.

3. The container of claim 2 wherein the metal is stainless steel.

4. The container of claim 1 wherein the inner window crystal and the outer window crystal are made from a plastic comprising a polycarbonate.

5. The container of claim 1 wherein the receptacle is a measuring cup having a plurality of graduated measuring indices located thereon.

6. The container of claim 1 wherein the outer window crystal comprises a plurality of graduated measuring indices located thereon.

7. The container of claim 1 wherein the raised portion comprises a plurality of curvilinear portions.

8. The container of claim 7 wherein the shape of the aperture comprises a plurality of curvilinear portions adapted to substantially align with the plurality of curvilinear portions of the raised portion.

9. The container of claim 1 wherein the sealing ring is made from silicone rubber.

10. The container of claim 1 wherein the wherein inner window crystal and the outer window crystal are joined together by an ultrasonic bonding process.

11. The container of claim 1 wherein the inner window crystal comprises the raised portion.

12. The container of claim 1 wherein the outer window crystal comprises the raised ridge.

* * * * *